(12) United States Patent
Prasad et al.

(10) Patent No.: US 8,051,066 B2
(45) Date of Patent: Nov. 1, 2011

(54) EXPRESSION-BASED WEB LOGGER FOR USAGE AND NAVIGATIONAL BEHAVIOR TRACKING

(75) Inventors: Rajeev Prasad, Kirkland, WA (US); Kevin Paul Kornelson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 95 days.

(21) Appl. No.: 12/498,556

(22) Filed: Jul. 7, 2009

(65) Prior Publication Data

US 2009/0276523 A1    Nov. 5, 2009

Related U.S. Application Data

(62) Division of application No. 10/748,716, filed on Dec. 30, 2003, now Pat. No. 7,567,979.

(60) Provisional application No. 60/495,348, filed on Aug. 15, 2003.

(51) Int. Cl.
G06F 17/30 (2006.01)

(52) U.S. Cl. ........ 707/708; 707/709; 707/716; 707/721; 707/769; 707/770; 707/771; 707/776; 707/784; 707/812; 709/200; 709/203; 709/220; 709/224; 709/227

(58) Field of Classification Search ............... 707/769, 707/770, 776, 708, 709, 716, 721, 771, 784, 707/812; 709/200, 203, 220, 224, 227
See application file for complete search history.

(56) References Cited

U.S. PATENT DOCUMENTS

| | | | |
|---|---|---|---|
| 5,819,094 A | 10/1998 | Sato et al. | |
| 6,230,153 B1 | 5/2001 | Howard et al. | |
| 6,272,531 B1 | 8/2001 | Shrader | |
| 6,311,190 B1 | 10/2001 | Bayer et al. | |
| 6,502,102 B1 | 12/2002 | Haswell et al. | |
| 6,516,338 B1 * | 2/2003 | Landsman et al. | 709/203 |
| 6,564,213 B1 | 5/2003 | Ortega et al. | |
| 6,601,100 B2 | 7/2003 | Lee et al. | |
| 6,606,644 B1 | 8/2003 | Ford et al. | |
| 6,640,145 B2 | 10/2003 | Hoffberg et al. | |
| 6,643,641 B1 | 11/2003 | Snyder | |
| 6,687,737 B2 * | 2/2004 | Landsman et al. | 709/203 |
| 6,735,592 B1 | 5/2004 | Neumann et al. | |
| 6,757,691 B1 * | 6/2004 | Welsh et al. | 1/1 |
| 6,826,594 B1 * | 11/2004 | Pettersen | 709/203 |
| 6,845,374 B1 | 1/2005 | Oliver et al. | |
| 6,871,228 B2 | 3/2005 | Shah et al. | |
| 6,892,226 B1 | 5/2005 | Tso et al. | |
| 6,996,536 B1 * | 2/2006 | Cofino et al. | 705/26 |
| 7,174,345 B2 * | 2/2007 | Malaney et al. | 707/800 |
| 7,181,412 B1 | 2/2007 | Fulgoni et al. | |
| 7,475,404 B2 * | 1/2009 | Hamel | 719/317 |

(Continued)

OTHER PUBLICATIONS

Bauer, "Paranoid Penguin: Swatch: Automated Log Monitoring for the Vigilant But Lazy," Linux Journal, Aug. 2001, vol. 2001, Issue 88, 55 pages, Specialized Systems Consultants, Inc., Seattle, Washington, U.S.A.

(Continued)

Primary Examiner — Thanh-Ha Dang
(74) Attorney, Agent, or Firm — Senniger Powers LLP

(57) ABSTRACT

Configurably storing data in a plurality of files based on expressions and conditions associated with the data. Logging software enables tracking of the navigation pattern of users for selected network properties under specified conditions. The logging software is configurable such that most current and future logging specifications may be fulfilled without any code changes to the logging software.

15 Claims, 5 Drawing Sheets

U.S. PATENT DOCUMENTS

| | | | | |
|---|---|---|---|---|
| 2002/0007393 | A1* | 1/2002 | Hamel | 709/203 |
| 2002/0023158 | A1 | 2/2002 | Polizzi et al. | |
| 2002/0042821 | A1* | 4/2002 | Muret et al. | 709/223 |
| 2002/0083067 | A1* | 6/2002 | Tamayo et al. | 707/100 |
| 2002/0087679 | A1* | 7/2002 | Pulley et al. | 709/224 |
| 2002/0143925 | A1 | 10/2002 | Pricer et al. | |
| 2002/0143933 | A1* | 10/2002 | Hind et al. | 709/224 |
| 2002/0178257 | A1* | 11/2002 | Cerrato | 709/224 |
| 2003/0014335 | A1 | 1/2003 | Lecheler-Moore et al. | |
| 2003/0023715 | A1* | 1/2003 | Reiner et al. | 709/224 |
| 2003/0154237 | A1* | 8/2003 | Mah et al. | 709/201 |
| 2003/0187677 | A1* | 10/2003 | Malireddy et al. | 705/1 |
| 2003/0195837 | A1* | 10/2003 | Kostic et al. | 705/37 |
| 2004/0111507 | A1 | 6/2004 | Villado et al. | |
| 2004/0117802 | A1 | 6/2004 | Green | |
| 2004/0139452 | A1 | 7/2004 | Hope et al. | |
| 2004/0243555 | A1* | 12/2004 | Bolsius et al. | 707/3 |
| 2004/0243618 | A1* | 12/2004 | Malaney et al. | 707/102 |
| 2005/0033803 | A1 | 2/2005 | Vleet et al. | |
| 2006/0129906 | A1* | 6/2006 | Wall | 715/500 |
| 2007/0011039 | A1* | 1/2007 | Oddo | 705/10 |
| 2007/0094208 | A1* | 4/2007 | Cerrato | 706/48 |

OTHER PUBLICATIONS

Baker et al., "Extended Log File Format," W3C Working Draft WD-logfile-960323, printed from http://www.w3.org/pub/WWW/TR/WD-logfile-960323.html on Oct. 30, 2003, 6 pages, World Wide Web Consortium, U.S.A.

"Types of Web Servers and Data They Track," printed from http://www.sic.nvgc.vt.edu/SICstuff-Virtual/Heine/WWW/webservers.htm on Oct. 30, 2003, 1 page, SIC e-Business Systems Integration Center, U.S.A.

Larsen, "Data Transformation Services (DTC) in SQL Server 2000," Microsoft SQL Tech Center, 13 pages, Sep. 2000, Microsoft Corporation, U.S.A.

* cited by examiner

EXPRESSION-BASED WEB LOGGER FOR USAGE AND NAVIGATIONAL BEHAVIOR TRACKING

TECHNICAL FIELD

Embodiments of the present invention relate to the field of data logging. In particular, embodiments of this invention relate to efficiently filter and organize large amounts of relevant data for storage in a data warehouse.

BACKGROUND OF THE INVENTION

A data warehouse is a database designed to support decision-making in an organization. A typical data warehouse is batch updated on a periodic basis and contains an enormous amount of data. For example, large retail organizations may store one hundred gigabytes or more of transaction history in a data warehouse. In another example, tracking the usage of different resources or properties (e.g., web sites) across a network involves logging billions of hits every day and storing them in the data warehouse. The data in a data warehouse is typically historical and static and may also contain numerous summaries. It is structured to support a variety of analyses, including elaborate queries on large amounts of data that can require extensive searching.

Existing systems require creation of a new service to log information to different files within the data warehouse. Further, existing systems are restrictive in that they fail to allow customization of the files including customization of the columns in the files. Such systems also limit the log cut frequency to hourly and daily values.

A data warehouse may store user navigation data (e.g., clickstream data). Existing systems track the user navigation patterns by generating cookies and storing relevant information on a client device to be later stored in the data warehouse. Further, the existing systems require creation of a new service to track specific properties (e.g., web pages) or require modification to the properties to be tracked. For example, in existing systems, the individual properties read and write cookies that are stored on the client device. However, such de-centralized systems have to update each of the property pages every time a change in cookie behavior is desired.

Accordingly, a configurable logging system that filters, organizes, and stores a large amount of data is desired to address one or more of these and other disadvantages.

SUMMARY OF THE INVENTION

Embodiments of the invention include an expression-based data filtering and storage system that divides data (e.g., log data) into different logical and more manageable portions. The invention is configurable such that logging specifications may be fulfilled by simply modifying configuration information. For example, in a software implementation, no modifications would need to be made to the core software implementing the invention to adjust the logging specifications. The invention further tracks the navigation pattern of users for selected resources under specified conditions (e.g., via the configuration information). For example, the invention includes a central server which reads and writes a cookie with the navigation data to enable centralized behavior tracking such as campaign tracking and click stream preparation. The invention is applicable to any web tracking solution and works as an entry point utility to different web data warehousing and data mining platforms. Further, the invention may be incorporated into existing web servers or application programs such as INTERNET INFORMATION SERVICES brand web server software by Microsoft Corp. of Redmond, Wash.

The invention identifies desired data and only stores the identified data in accordance with the configuration information. In this manner, the invention reduces the amount of memory needed and reduces the complexity of post-storage queries by only storing relevant data. The invention pre-filters received data per configuration information to minimize downstream processing and to enable data sampling prior to storage of the data. In one form, the invention receives data and organizes the data in real-time. The invention also enables data sampling, partitioning, cleaning, and transformation prior to storing the data.

In accordance with one aspect of the invention, a method organizes data prior to storing the data. The method includes accessing configuration information associated with the data to be stored. The configuration information includes at least one expression. The method also includes receiving data including at least one condition, evaluating the expression based on the condition, and storing the received data in accordance with the evaluated expression.

In accordance with another aspect of the invention, one or more computer-readable media have computer-executable components for filtering data prior to storing the data. The components include a configuration component to access configuration information associated with the data to be stored. The configuration information includes at least one expression. The components also include an interface component to receive data including at least one condition. The components also include an expression component to evaluate the expression accessed by the configuration component based on the condition received by the interface component. The components also include a storage component to store the data received by the interface component in accordance with the expression evaluated by the expression component.

In accordance with still another aspect of the invention, a system organizes data prior to storing the data. The data includes at least one condition. The system includes a memory area to store configuration information associated with the data to be stored. The configuration information includes at least one expression. The system also includes a computing device to process data. The system also includes a computer-readable medium that stores computer-executable instructions to be executed on the computing device to evaluate the expression based on the condition and to store the received data in accordance with the evaluated expression.

In accordance with yet another aspect of the invention, a method tracks user behavior. The method includes accessing configuration information including at least one expression defining a specific user navigation path. The method also includes receiving, from a computing device, clickstream data including at least one condition. The method also includes analyzing the clickstream data by evaluating the expression using the condition to determine a relationship between the user navigation path and the clickstream data. The method also includes storing the clickstream data in accordance with the determined relationship.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Data Warehousing

Figure 1:
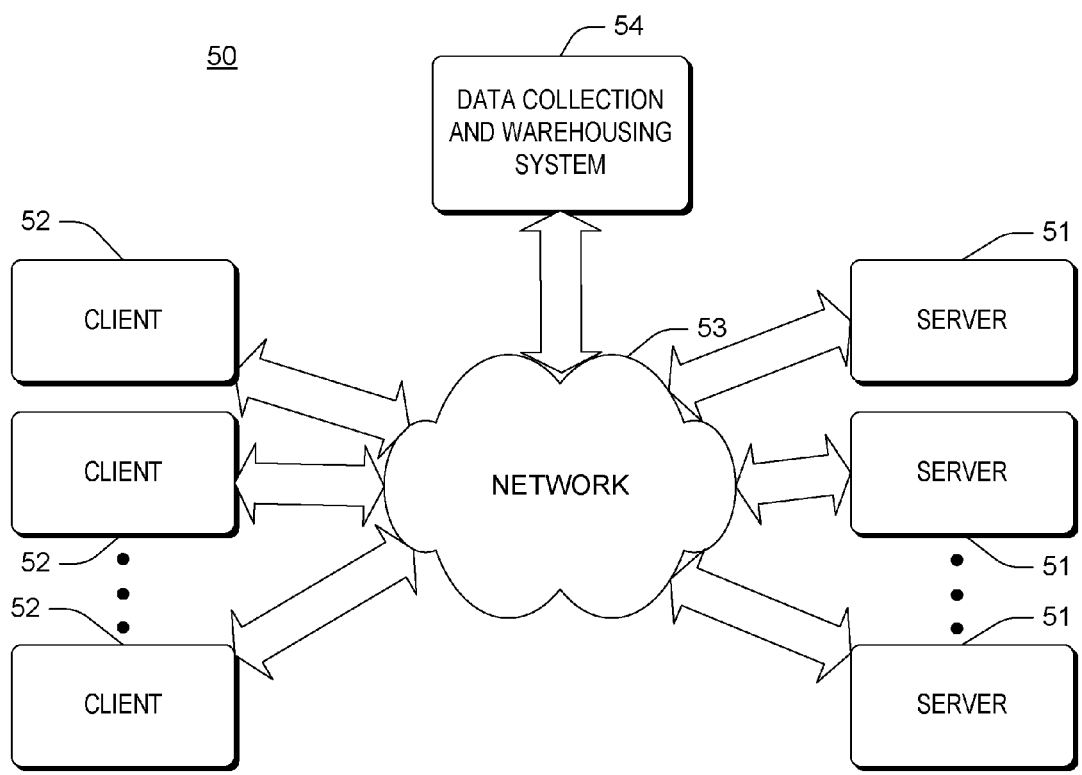
FIG. 1 is an exemplary embodiment of a client/server network system and a data collection and warehousing system.

Referring first to FIG. 1, an exemplary embodiment of the invention includes a client/server network system 50 and a data collection and warehousing system 54. FIG. 1 shows the network system 50 comprising a plurality of servers 51 and clients 52. These computers 51, 52 are connected for high-speed data communications over a network 53, using well-known networking technology. The Internet is one example of network 53. Servers 51 accept requests from large numbers of remote network clients 52. The data servers 51 provide responses comprising data that potentially includes graphically formatted information pages. In many cases, the data is in the form of hypertext markup language (HTML) documents. In addition to the servers 51 and clients 52, the system of FIG. 1 includes a central collection facility or data warehousing system 54. The data warehousing system 54 communicates through network 53 with other network nodes such as servers 51 and clients 52, although other means of communication may also be utilized.

Logging software, executing on servers 51 or other computing devices (e.g., associated with the data warehouse system 54), receives log records from a plurality of servers. Each of the log records represents, for example, a request for a web page. The operation of exemplary logging software of the invention is next described.

Operation of the Logging Software

Figure 2:
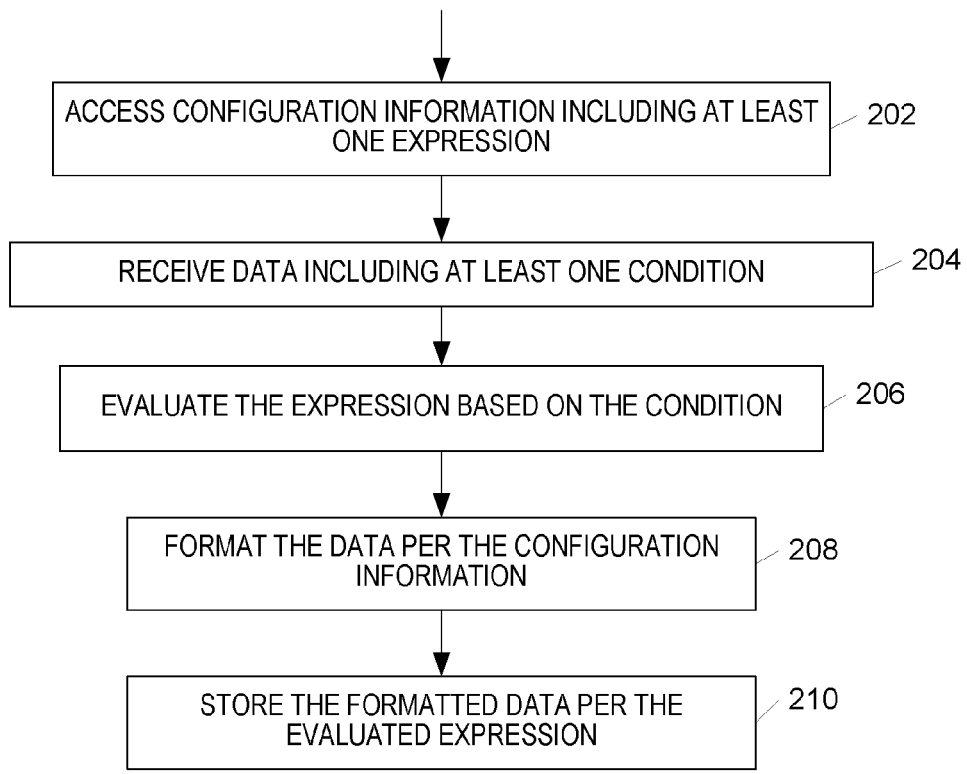
FIG. 2 is an exemplary flow chart illustrating operation of intelligent logging software according to the invention.

Referring next to FIG. 2, an exemplary flow chart illustrates operation of intelligent logging software. The logging software organizes data prior to storing the data. For example, the logging software may be configured to only log clickstream data from users who click on banner A then banner B. In another embodiment, the logging software operates to only track server X during interval Y. In particular, the logging software accesses configuration information associated with the data to be stored at 202. For example, the logging software may read configuration information from a central hierarchical database. The configuration information includes at least one expression. An expression includes a combination of symbols (e.g., identifiers, values, and operators) that yields a result (e.g., a value representing a condition) upon evaluation. The web server establishes the configuration information at some time prior to operation of the logging software. For example, the logging software may receive the configuration information from a user. The logging software receives data (e.g., from a computing device) including at least one condition representing the state of an expression or variable at 204. The logging software authenticates the computing device and opens a plurality of files to store the received data. For example, the received data may include clickstream web data. The logging software evaluates the expression based on the condition at 206 and formats the data in accordance with the accessed configuration information at 208 prior to storing the data per the evaluated expression at 210. For example, the evaluated expression may indicate that only a portion of the received data should be stored.

In one form, the logging software recursively evaluates portions of the expression using the condition. In another form, the logging software evaluates the expression by forwarding the received data to a filter component to evaluate the expression using the condition. The logging software receives the evaluated expression from the filter component. The logging software stores the received log data by preparing column data responsive to the received data, the evaluated expression, and the configuration information. The logging software stores the prepared column data in a file.

The logging software maintains a history of evaluated expressions to track a sequence of the evaluated expressions. For example, the logging component tracks the user behavior by centrally controlling or otherwise managing the reading and writing of cookies on the computing device. The cookie is associated with the computing device generating the received data and indicates the sequence of the evaluated expressions. The logging software supports multiple and conditional cookies as specified by the configuration information. In one embodiment, the logging software receives and evaluates the received data in real-time. In another embodiment, the logging software batches the received data and analyzes the batched data. The invention enables data sampling prior to storage of the data as well as after storage of the data. The invention also enables data sampling, partitioning, cleaning, and transformation prior to storing the data. One or more computer-readable media have computer-executable instructions for performing the method illustrated in FIG. 2.

Exemplary components of the logging software of the invention are next described.

Structure of the Logging Software

Figure 3:
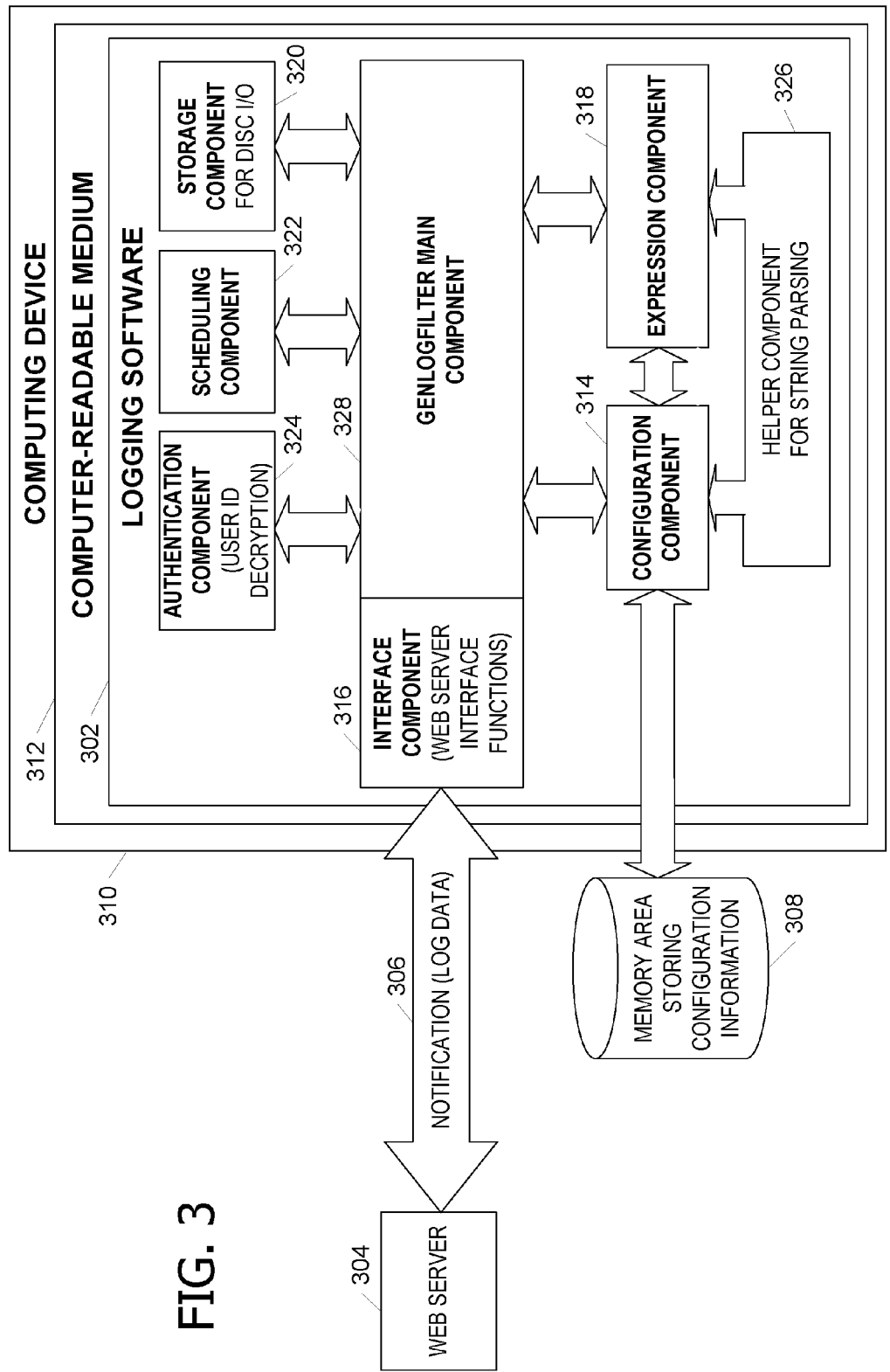
FIG. 3 is an exemplary block diagram illustrating the elements of an expression-based data filtering and storage system according to the invention.

Referring next to FIG. 3, an exemplary block diagram illustrates elements in the logging software 302 of the invention. While described in the context of a web server 304 generating notifications 306, the invention is operable with any web server or other data source. In one embodiment, the logging software 302 is an Internet server application programming interface (ISAPI) filter (e.g., GenLogFilter) responsive to a filter notification 306 such as SF_NOTIFY_AUTH_COMPLETE received from the web server 304. In one example, the web server 304 sends the notification 306 to the logging software 302 just after authenticating the user associated with the data and before preparing the response headers. During startup, the logging software 302 performs configuration initialization, authentication, and file creation. The logging software 302 also initializes management of log cut data. Log cut data identifies the circumstances (e.g., time intervals) in which a new file is to be opened. At the specified intervals, the logging software 302 opens a new file to store data. After startup, the logging software 302 is ready to receive data.

When the web server 304 receives a user request, the web server 304 sends the notification 306 to the logging software 302. The logging software 302 performs various operations responsive to receipt of this notification 306 such as parsing the raw data (e.g., hypertext transfer protocol data) and preparing the column data. The logging software 302 also writes the data to the log as specified by the configuration information. The logging software 302 prepares the set-cookie header using the column data and sends the cookie to the client via a web server 304 function such as AddResponseHeaders. The logging software 302 performs the exemplary operations when the notification 306 is received from the web server 304. The web server 304 calls another exposed function such as TerminateFilter to stop execution of the logging software 302. TerminateFilter also frees all resources associated with the logging software 302.

Referring again to FIG. 3, an exemplary processing environment organizes data prior to storing the data. The environment includes a memory area 308 storing configuration information, a computing device 310, and a computer-readable medium 312. In one embodiment, one or more computer-readable media such as computer-readable medium 312 have computer-executable components for filtering data prior to storing the data. The components include a configuration component 314, an interface component 316, an expression component 318, and a storage component 320. The memory area 308 stores configuration information associated with the data to be stored. The memory area 308 may be local to or part of the computing device 310 or, alternatively or in addition, may be centrally located such that other computing devices may also access the memory area 308. Further, the memory area 308 may be the same as or different from the computer-readable medium 312. The computing device 310 processes the data (e.g., as received from the web server 304 directly or via another computing device). The computer-readable medium 312 stores computer-executable instructions to be executed on the computing device 310 to evaluate the expression based on the condition. The instructions further execute to store the received data (e.g., in another memory area as a plurality of files) in accordance with the evaluated expression. In one embodiment, the computer-executable instructions execute on the computing device 310 in real-time to receive the data and to filter the received data prior to storage of the data.

The configuration component 314 accesses configuration information associated with the data to be stored. The configuration information includes at least one expression. The configuration component 314, when executed, creates structured data with enumerated values associated therewith based on the received configuration information. For example, the configuration component 314, when executed, reads the configuration information (e.g., from a registry) and translates the read information into a set of structured data with enumerated values for use by the other components. In one embodiment, the configuration component 314 reads the configuration information (e.g., from a registry) and validates the read configuration information. The configuration component 314 assigns default values, enumerates column configurations, and assigns indexes in place of column names. The configuration information is available for use by the system components after being parsed and translated by the configuration component 314.

The interface component 316 receives data including at least one condition. The expression component 318 evaluates the expression based on the condition. The expression component 318, when executed, performs expression parsing and evaluation of different conditions. The expression component 318 is capable of evaluating expressions having various operators including, but not limited to, "include," "exclude," "or," "and," "contains," "not contains," "beginswith," "notbeginsWith," "endswith," and "notendswith." Depending upon the complexity of the expression, the expression component 318 creates an expression tree which may be evaluated.

The storage component 320 stores the received data in accordance with the evaluated expression. The storage component 320, when executed, performs write operations to the disk. In one example, the storage component 320 performs the disk write asynchronously using two buffers of two megabytes each. The storage component 320 writes the data to the disk when the buffer is full for the file is being closed. In a multi-threaded application, the web server 304 may call the storage component 320 from different threads simultaneously. The asynchronous implementation of the storage component 320 achieves thread synchronization.

The computer-executable components of the logging software 302 also include a scheduling component 322 to create a file for use by the storage component 320 to store the received data. The scheduling component 322, when executed, creates a waitable timer object having a configurable interval (e.g., one minute). When this object is signaled at the interval, it compares the difference between the current time and the time stamp of the currently open file. If this difference matches a configurable threshold, it calls a function to create a new file.

The components further include an authentication component 324 to obtain user information associated with the data received by the interface component 316. The authentication component 324, when executed, decrypts an encrypted authentication cookie received with the data from the web server 304 to obtain the user identifier and other profile information. The authentication component 324 returns a data structure populated with the user identifier and profile information responsive to receiving a request from the web server 304.

The components further include a helper component 326 to parse the data received by the interface component 316 for use by the expression component 318. The helper component 326, when executed, assists in parsing expressions by storing string values and parsed data. A GenLogFilter main component 328, when executed, initializes the configuration information, initializes the log files, and initializes log cut management.

Configuration Information

The configuration information or data includes various configurable entries including, but not limited to, those described herein. Other structures, formats, and content of the configuration information not disclosed herein are also within the scope of the invention. The configuration information includes configurable log columns. The columns and their positions are specified from the predefined set of columns or may be defined as expressions. Configuration data is added as "tag=value" or as a separate column. The column delimiter and line delimiter are configured based on the input specifications.

The configuration information also specifies a configurable number of files. The logging software 302 writes to the multiple files based on the evaluated expression. The evaluated expression is based on the presence of some tag or on some specific value or condition in the data incoming from the web server 304. Configuration information may also specify an error file to store the log entries that do not qualify for any other log file. A default configuration may provide a default error file which may then be altered by the user depending upon the information needed in the error file. The log records that do not qualify for any other log file are written to this error file. The file name of each log file may be specified based on either some predefined values (e.g., date or hour) and may also have some predefined text.

Configuration information also specifies a frequency to initiate the creation of a new log file (e.g., based on duration in minutes or on the size of the log file). At a specified time or size, for example, the logging software 302 closes the current log file even if the server is not actively receiving data. In one embodiment, the log cut functionality is implemented in the scheduling component 322.

In an embodiment in which the configuration information is stored in a registry, the registry entries are stored as subkeys and values of a key such as HKEY_LOCAL_MACHINE\SOFTWARE\\GenLogFilter. Sample configuration data are shown in Appendix A.

Figure 4:
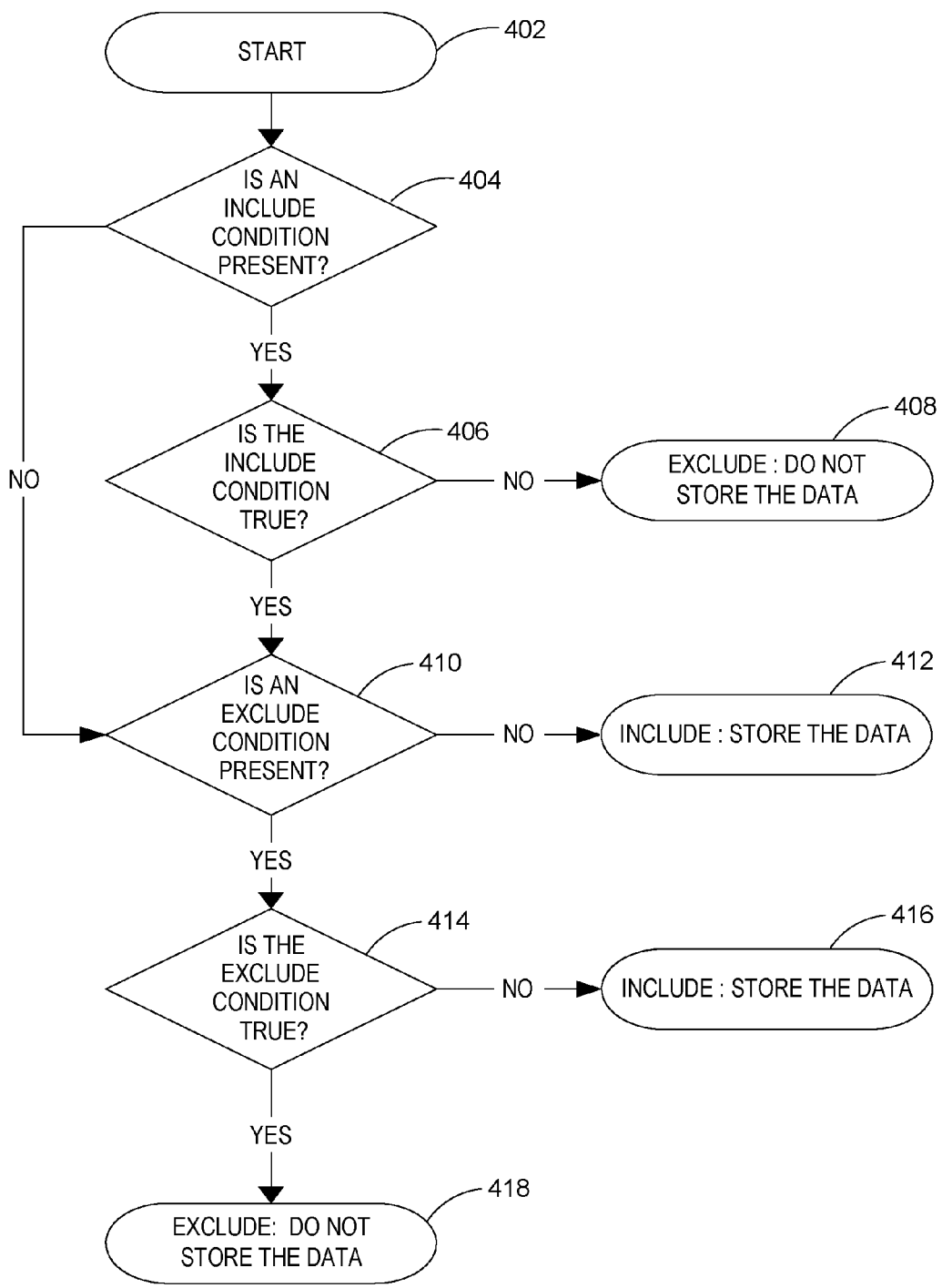
FIG. 4 is an exemplary flow chart illustrating condition evaluation according to the invention.

Referring next to FIG. 4, an exemplary flow chart illustrates expression evaluation by logging software such as logging software 302. Expression evaluation is initiated at 402. If an include condition is present at 404 but evaluates false at 406, the received data is not stored at 408. If an include condition is present at 404, true at 406, and an exclude condition is not present at 410 (or is present at 410, but not true at 414), the received data is stored at 412 (or stored at 416). If an exclude condition is present at 410 and true at 414 (whether an include condition is present or true), the received data is not stored at 418.

FIG. 4 illustrates exemplary operation of expression evaluation. Different yet related operating environments, logic, and flow charts are written the scope of the invention.

Exemplary Expressions and Columns

The log file, cookies, tags, and conditions may be written using the following exemplary expressions. Other expressions not shown below are also within the scope of the invention. In operation, names, constants, and subexpressions are substituted for the italic text shown below.

condition:=
    condition and condition
    condition or condition
    (condition)
    not condition
    expression contains "string"
    expression not contains "string"
    expression begins with "string"
    expression not begins with "string"
    expression ends with "string"
    expression not ends with "string"
expression:=
    column
    extract "tag" from datasource The data may be organized into exemplary columns such as shown in Table 1.

TABLE 1

Exemplary column configuration.

| Name | Description |
|---|---|
| ClientIP | The IP address of the client. |
| UserName | The user name of the client, if anonymous this has the blank value. |
| HitDate | The date of the hit in the format mm/dd/yyyy. |
| HitTime | Time in the format hh:mm:ss |
| ServiceFormat | Has the service name such as W3CSVC1. |
| ServerName | Name of the server. |
| ServerIP | IP address of the server. |
| BytesReceived | Contains the size of data received by the server. |
| ServiceStatus | Describes the service status (e.g., 200). |
| Method | Either GET or POST depending upon the request. |
| Target | The actual target URL without domain name and query string. E.g., /c.gif |
| UserAgent | The user agent string |
| Referrer | The referrer header. |
| GUID | GUID extracted from the Cookie. |
| UserID | User Id if present. |
| UserPostalCode | User postal code. |
| UserCountry | User country. |
| UserGender | User Gender. |
| UserBDayPrec | User birthday precision. |
| UserRegion | User region. |
| UserLangPref | User Language ID |
| UserPreferredEmail | User Email address. |
| UserWallet | User wallet flag. |
| UserOccupation | User occupation character. |

TABLE 1-continued

Exemplary column configuration.

| Name | Description |
|---|---|
| UserBDay | User birthday in format mm/dd/yyyy |
| UserFlags | Four byte flags. |
| Partner | Partner string extracted from the COOKIE. |
| TQS | The complete query string. |
| COOKIE | The complete cookie string. |

The variables shown below may be expanded with the exemplary substitutions listed in Table 2.

TABLE 2

Exemplary filename substitutions.

path :=
    drive:\directory
    path\directory
directory :=
    filenamepart...
filename :=
    filenamepart...
filenamepart :=
    string
    substitution
columnlist :=
    column
    columnlist, column
taglist :=
    tag
    taglist, tag
valuelist :=
    expression
    valuelist, expression

| Name | Value |
|---|---|
| <domain> | The registry specified domain name (see under GenLogFilter key). |
| <service> | The registry specified service name (see under GenLogFilter key). |
| <yyyy> | Four digit year |
| <mm> | 2 digit month |
| <dd> | 2 digit date |
| <starthh> | 2 digit start hour |
| <startmm> | 2 digit start min |
| <endhh> | 2 digit end hour |
| <endmm> | 2 digit end min |
| <server> | Name of the server. |

Exemplary Operating Environment

Figure 5:
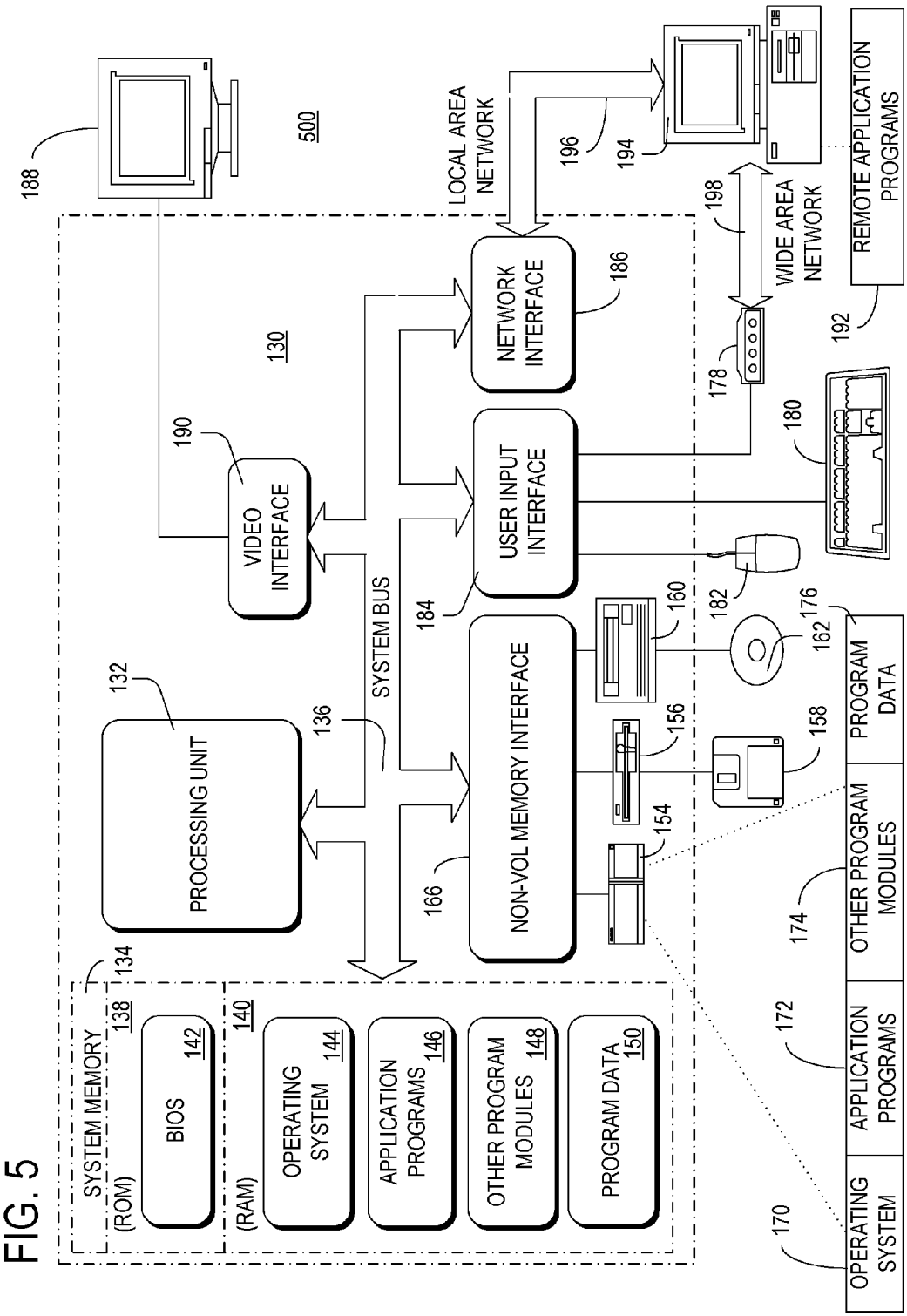
FIG. 5 is a block diagram illustrating one example of a suitable computing system environment in which the invention may be implemented.

FIG. 5 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 5 illustrates operating system 144, application programs 146, other program modules 148, and program data 150.

The computer 130 may also include other removable/non-removable, volatile/nonvolatile computer storage media. For example, FIG. 5 illustrates a hard disk drive 154 that reads from or writes to non-removable, nonvolatile magnetic media. FIG. 5 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 5, provide storage of computer readable instructions, data structures, program modules and other data for the computer 130. In FIG. 5, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 5 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 5 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions and components such as those illustrated in FIG. 2, FIG. 3, and FIG. 4 to efficiently organize, process and store large amounts of data.

EXAMPLES

The following examples further illustrate the invention. In one example, logging software such as logging software operates to track user behavior by accessing configuration information defining a specific user navigation path (e.g., as an expression). The logging software receives, from a computing device, clickstream data including at least one condition and analyzes the clickstream data by evaluating the expression using the condition. The analysis determines a relationship between the user navigation path and the clickstream data. In one embodiment, receiving the clickstream data and analyzing the received clickstream data occur in real-time. The logging software formats the clickstream data in accordance with the accessed configuration information (e.g., by separating the clickstream data into columns). In one embodiment, analyzing the received clickstream data includes forwarding the received clickstream data to a filter component to evaluate the expression using the condition and receiving the evaluated expression from the filter component. The logging software stores the clickstream data in accordance with the determined relationship. In addition, the logging software stores the clickstream data by storing a cookie associated with the computing device on the computing device per the evaluated expression. Further, the logging software maintains a sequence of evaluated expressions to track user navigational behavior.

Those skilled in the art will note that the order of execution or performance of the methods illustrated and described herein is not essential, unless otherwise specified. That is, elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

APPENDIX A

Exemplary configuration data are shown below.

```
[HKEY_LOCAL_MACHINE\SOFTWARE\GenLogFilter]
"Logging Enabled"=dword:00000001
"Domain"="c.pageA.net"
"service"="w3svc1"
```

-continued

```
[HKEY_LOCAL_MACHINE\SOFTWARE\GenLogFilter\Columns]
"ClientIP"="ClientIP"
"UserName"="UserName"
"HitDate"="HitDate"
"HitTime"="HitTime"
"ServiceFormat"="ServiceFormat"
"ServerName"="ServerName"
"ServerIP"="ServerIP"
"ElapsedTime"="ElapsedTime"
"BytesReceived"="BytesReceived"
"BytesSent"="BytesSent"
"ServiceStatus"="ServiceStatus"
"APIStatus"="APIStatus"
"Method"="Method"
"Target"="Target"
"UserAgent"="UserAgent"
"Referrer"="Referrer"
"GUID"="GUID"
"UserID"="UserID"
"UserPostalCode"="UserPostalCode"
"UserCountry"="UserCountry"
"UserGender"="UserGender"
"UserBDayPrec"="UserBDayPrec"
"UserRegion"="UserRegion"
"UserLangPref"="UserLangPref"
"UserPreferredEmail"="UserPreferredEmail"
"UserWallet"="UserWallet"
"UserOccupation"="UserOccupation"
"UserBDay"="UserBDay"
"Partner"="Partner"
"TQS"="TQS"
"MyGUID"="extract CTID from COOKIE"
"Cookie"="Cookie"
"MyAPID"="extract APID from TQS"
[HKEY_LOCAL_MACHINE\SOFTWARE\GenLogFilter\Cookies]
[HKEY_LOCAL_MACHINE\SOFTWARE\GenLogFilter\Cookies\conversionCookie]
"Cookie Enabled"=dword:00000001
"Condition"="TQS contains APID or TQS contains TPID and COOKIE contains xTag"
"Cookie Type"="Persistence"
"Cookie Tag"="MUID"
"Domain"=""
"Cookie Value"="MyAPID"
[HKEY_LOCAL_MACHINE\SOFTWARE\GenLogFilter\LogFiles]
[HKEY_LOCAL_MACHINE\SOFTWARE\GenLogFilter\LogFiles\CLog]
"File Name"="in<yyyy><mm><dd>_<starthh><startmm><endhh><endmm>_<SERVER>_<DOMAIN>_<service>.log"
"Include Condition"="COOKIE contains \"MUID\""
"Exclude Condition"=""
"Column Separator"="COMMA"
"Column Order"="ClientIP,UserName,HitDate,HitTime,ServiceFormat,ServerName,ServerIP,ElapsedTime,BytesReceived,BytesSent,ServiceStatus,APIStatus,Method,Target,UserAgent,Referrer,GUID,UserID,Partner,TQS"
"Frequency"="5min"
"Line Separator"="NL"
"TQSTags"="izi,icy,ige,iag,ire,ili,iem,iwa,ibdy,ioc"
"TQSValues"="UserPostalCode,UserCountry,UserGender,UserBDayPrec,UserRegion,UserLangPref,UserPreferredEmail,UserWallet,UserBDay,UserOccupation"
"enabled"=dword:00000001
"Directory"="c:\\wwwlog"
[HKEY_LOCAL_MACHINE\SOFTWARE\GenLogFilter\LogFiles\ErrorLog]
"File Name"="in<yyyy><mm><dd>_<starthh><startmm><endhh><endmm>_<SERVER>_<DOMAIN>_<service>.Error.log"
"Include Condition"="Error"
"Exclude Condition"=""
"Column Separator"="COMMA"
"Line Separator"="NewLine"
"Column Order"="ClientIP,UserName,HitDate,HitTime,ServiceFormat,ServerName,ServerIP,ElapsedTime,BytesReceived,BytesSent,ServiceStatus,APIStatus,Method,Target,UserAgent,Referrer,GUID,UserID,Partner,TQS"
"Frequency"="5min"
"TQSTags"="izi,icy,ige,iag,ire,ili,iem,iwa,ibdy,ioc"
"TQSValues"="UserPostalCode,UserCountry,UserGender,UserBDayPrec,UserRegion,UserLangPref,UserPreferredEmail,UserWallet,UserOccupation,UserBDay"
"Enabled"=dword:00000001
"Directory"="c:\\wwwlog"
```

What is claimed is:

1. A method for tracking user navigational behavior, said method comprising:

accessing configuration information including at least one expression defining a specific user navigation path;

receiving, from a web server, clickstream data, said clickstream data being in a format defined by the web server, said clickstream data including a plurality of conditions, said plurality of conditions being associated with said clickstream data and affecting storage thereof;

analyzing the received clickstream data, said analyzing comprising evaluating the expression from the accessed configuration information by using the condition to determine a relationship between the specific user navigation path and the received clickstream data; and storing the received clickstream data, said storing comprising:

storing a first portion of the received clickstream data in a first file in accordance with the determined relationship without modifying the format of the received clickstream data defined by the web server, wherein the determined relationship yields at least one condition of the plurality of conditions as associated with the stored first portion of the received clickstream data; and storing a second portion of the received clickstream data in a second file different from the first file and in accordance with the determined relationship without modifying the format of the received clickstream data defined by the web server, wherein the determined relationship yields at least one of the plurality of conditions as excluding the received clickstream data from being associated with the second portion of the received clickstream data.

2. The method of claim 1, wherein storing the received clickstream data comprises storing a cookie associated with a computing device in accordance with the evaluated expression.

3. The method of claim 1, further comprising formatting the received clickstream data in accordance with the accessed configuration information.

4. The method of claim 3, wherein formatting the received clickstream data comprises separating the received clickstream data into columns.

5. The method of claim 1, wherein storing the received clickstream data comprises maintaining a sequence of evaluated expressions to track user navigational behavior.

6. The method of claim 1, wherein analyzing the received clickstream data comprises:

forwarding the received clickstream data to a filter component to evaluate the expression using the condition; and receiving the evaluated expression from the filter component.

7. The method of claim 1, further comprising sampling the received clickstream data prior to storing the received clickstream data.

8. The method of claim 1, wherein said receiving the clickstream data and said analyzing the received clickstream data occur in real-time.

9. One or more computer storage media having computer-executable instructions for performing the method recited in claim 1.

10. A system for tracking user navigational behavior, said system comprising:

a memory area to store configuration information, said configuration information including at least one expression defining a specific user navigation path, said configuration information further defining a log cut interval specifying a maximum size for a clickstream file;

a computing device to access the configuration information and to process clickstream data received from a web server, said clickstream data being in a format defined by the web server, said clickstream data including at least one condition associated therewith, said condition being associated with said clickstream data and affecting storage thereof, wherein the computing device creates and opens the clickstream file; and a computer storage medium storing computer-executable instructions to be executed on the computing device to analyze the received clickstream data by evaluating the expression from the accessed configuration information prior to storage of the received clickstream data, said expression being evaluated by using the condition to determine a relationship between the specific user navigation path and the received clickstream data; and another memory area to store at least a portion of the received clickstream data in accordance with the determined relationship without modifying the format of the received clickstream data defined by the web server, wherein the computing device closes the opened clickstream file and the computing device creates and opens a new clickstream file based on the log cut interval, and wherein additional portions of the clickstream data received from the web server are stored in the new clickstream file.

11. The system of claim 10, wherein the computer-executable instructions to analyze the received clickstream data comprise computer-executable instructions to store a cookie associated with the computing device in accordance with the evaluated expression.

12. The system of claim 10, wherein the received clickstream data is formatted in accordance with the accessed configuration information.

13. The system of claim 10, wherein the received clickstream data comprises a sequence of evaluated expressions to track user navigational behavior.

14. The system of claim 10, wherein the computer-executable instructions to analyze the received clickstream data comprise computer-executable instructions to forward the received clickstream data to a filter component to evaluate the expression using the condition and to receive the evaluated expression from the filter component.

15. The system of claim 10, wherein the computer-executable instructions to analyze the received clickstream data comprise computer-executable instructions to sample the received clickstream data prior to storing the clickstream data.

* * * * *